United States Patent
Chen

(10) Patent No.: US 8,949,631 B2
(45) Date of Patent: Feb. 3, 2015

(54) USB POWER SUPPLY METHOD AND DEVICE, AND END DEVICE AND SYSTEM USING THE SAME

(75) Inventor: Hung-Yi Chen, New Taipei (TW)

(73) Assignee: Quanta Computer Inc., Tao Yuan Shien (TW)

(*) Notice: Subject to any disclaimer, the term of this patent is extended or adjusted under 35 U.S.C. 154(b) by 346 days.

(21) Appl. No.: 13/364,364

(22) Filed: Feb. 2, 2012

(65) Prior Publication Data
US 2013/0080797 A1    Mar. 28, 2013

(30) Foreign Application Priority Data
Sep. 23, 2011   (TW) .............................. 100134354 A

(51) Int. Cl.
| G06F 1/00 | (2006.01) |
| G06F 3/00 | (2006.01) |
| G06F 13/00 | (2006.01) |
| H02J 7/00 | (2006.01) |
| G06F 1/26 | (2006.01) |

(52) U.S. Cl.
CPC ...................................... G06F 1/266 (2013.01)
USPC ................. 713/300; 710/8; 710/10; 710/104; 320/134

(58) Field of Classification Search
CPC ......... G06F 1/26; G06F 1/266; G06F 9/4411; H02J 7/007; H02J 7/0004; H01M 10/44

USPC .................. 713/300; 710/8, 10, 104; 320/137
See application file for complete search history.

(56) References Cited

U.S. PATENT DOCUMENTS

| 8,193,776 B2 * | 6/2012 | Bayne et al. ................... 320/134 |
| 8,638,072 B2 * | 1/2014 | Vilhauer et al. .............. 320/162 |
| 2011/0016334 A1 * | 1/2011 | Tom et al. ..................... 713/300 |
| 2011/0057604 A1 * | 3/2011 | Capella ........................ 320/107 |
| 2012/0062182 A1 * | 3/2012 | Rimdzius et al. ............. 320/155 |
| 2012/0166173 A1 * | 6/2012 | Fischbach ........................ 703/28 |
| 2013/0154551 A1 * | 6/2013 | Jeansonne et al. ............ 320/107 |

* cited by examiner

*Primary Examiner* — Ji H Bae
(74) *Attorney, Agent, or Firm* — Rabin & Berdo, P.C.

(57) ABSTRACT

A Universal Serial Bus (USB) power supply method is provided. The method is applied to a USB client device to charge a battery of the USB client device. The USB client device is connected to a USB host device via a USB connection including a D+ signal wire and a D− signal wire. The USB power method includes: determining whether the USB host device is a dedicated charging port (DCP) in response to a connection event, providing a verification signal to the USB host device if the USB host device is a DCP, determining whether a verification response signal from the USB host device is received, and driving the USB host device to provide an auxiliary charging current via the D+ and D− signal lines for charging the battery when the verification response signal is received.

2 Claims, 3 Drawing Sheets

USB POWER SUPPLY METHOD AND DEVICE, AND END DEVICE AND SYSTEM USING THE SAME

This application claims the benefit of Taiwan application Serial No. 100134354, filed Sep. 23, 2011, the subject matter of which is incorporated herein by reference.

BACKGROUND OF THE INVENTION

1. Field of the Invention

The invention relates in general to a Universal Serial Bus (USB) power supply method, and more particularly to a USB power supply method applied under a condition of a connection established between an end device and a dedicated charging port (DCP).

2. Description of the Related Art

In a current society where technologies change at an overwhelmingly fast pace, handheld devices, e.g., digital personal assistants (PDA) and smart phones, prevail in the daily life as they offer indispensable conveniences. With the increasing upgrades in computation capabilities of handheld devices, power consumed by the handheld devices correspondingly increases. To offer handheld devices with sufficient power durability in response to high power requirements of such handheld devices, many handheld devices are allocated with large-capacity battery sets as proposed by a number of conventional solutions.

Provided that a charging current in a charging mechanism is constant, a battery set having a larger capacity needs a correspondingly longer charging time. For example, a Micro-USB connector is often utilized by handheld devices as a power supply path for charging a battery set of thousands of milliampere-hours (mAh). Yet, a common Micro-USB is capable of supplying a maximum charging current of 1.5 to 1.8 amperes (A). That is to say, user inconveniences are caused since a battery set of thousands of mAh requires a charging time of many hours to be fully charged. Hence, to enhance conveniences of handheld devices, there is a need for a solution that provides a high-rate charging current for applications adopting a Micro-USB as a power supply path.

SUMMARY OF THE INVENTION

The invention is directed to a Universal Serial Bus (USB) power supply method as well as a USB end device and a USB system applying the same. In the present invention, when determining whether a corresponding USB host device is a dedicated charging port (DCP), a verification procedure is performed on the USB host device to determine whether the USB host device supports a super DCP power supply mode. When a determination result is affirmative, the USB host device is driven to provide an auxiliary charging current via D+ and D− signal wires, so as to charge a battery of the USB host device with the auxiliary charging current. Accordingly, compared to a conventional USB power supply method, the USB power supply method as well as the USB end device and the USB system applying the USB power supply method disclosed by the present invention are advantaged by being capable of effectively providing a greater charging current and thus a shortened charging time.

According to an aspect of the present invention, a USB end device is provided. The USB end device is connected to a USB host device via a USB communication connection including a D+ signal wire and a D− signal wire. The USB end device includes a power supply unit, a detecting unit and a host control unit. The power supply unit includes a battery. The detecting unit determines whether the USB host device is a dedicated charging port (DCP), and provides a DCP detection signal if the USB host device is the DCP. In response to the DCP detection signal, the host control unit provides a verification signal to the USB host device, and determines whether a verification response signal from the USB host device is received. When the verification response signal is received, the host control unit drives the USB host device to provide an auxiliary charging current via the D+ and D− signal wires, and provides the auxiliary charging current from the D+ and D− signal wires to the power supply unit to charge the battery.

According to another aspect of the present invention, a USB system is provided. The USB system includes a USB host device, a USB communication connection and a USB end device. The USB host device includes a slave control unit. The USB communication connection includes a D+ signal wire and a D− signal wire. The USB end device, being connected to the USB host device via the USB communication connection, includes a power supply unit, a detecting unit and a host control unit. The power supply unit includes a battery. The detecting unit determines whether the USB host device is a DCP, and provides a DCP detection signal if the USB host device is the DCP. In response to the DCP detection signal, the host control unit provides a verification signal to the slave control unit, and determines whether a verification response signal from slave control unit is received. When the verification response signal is received, the host control unit drives the slave control unit to provide an auxiliary charging current via the D+ and D− signal wires, and provides the auxiliary charging current from the D+ and D− signal wires to the power supply unit to charge the battery.

According to yet another aspect of the present invention, a USB power supply method is provided. The method is applied to a USB client device to charge a battery of the USB client device. The USB client device is connected to the USB host device via a USB communication connection including a D+ signal wire and a D− signal wire. The power supply method includes: determining whether the USB host device is a DCP in response to a connection event, providing a verification signal to the USB host device if the USB host device is a DCP, determining whether a verification response signal from the USB host device is received, driving the USB host device to provide an auxiliary charging current via the D+ and D− signal lines, and charging the battery by auxiliary charging current from the D+ and D− signal lines.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
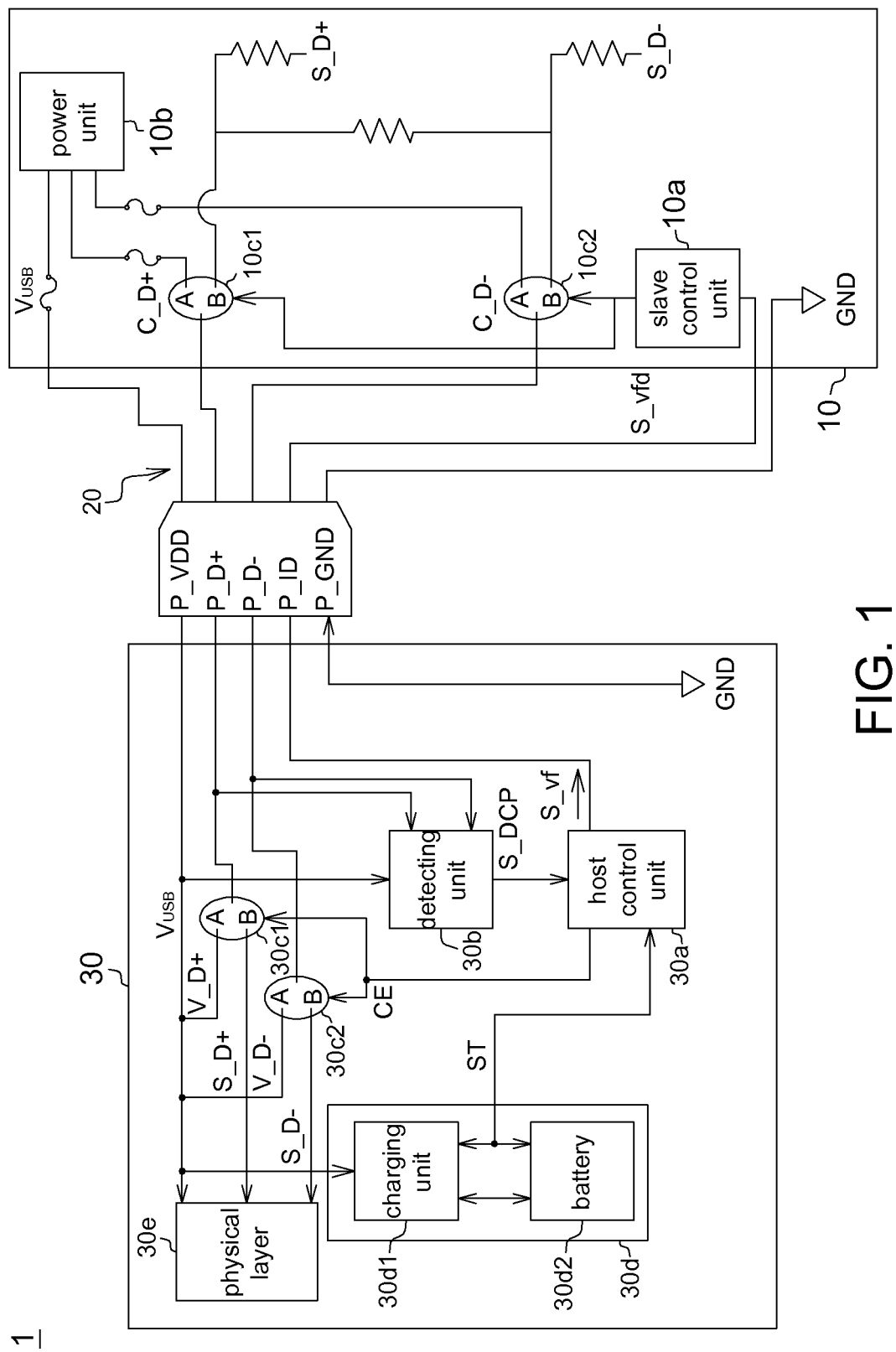
FIG. 1 is a block diagram of a USB system according to an embodiment of the present invention.

FIG. 1 shows a block diagram of a Universal Serial Bus (USB) system according to an embodiment of the present invention. A USB system 1 according to the embodiment includes a USB host device 10, a USB communication connection 20, and a USB end device 30. The USB communication connection 20 connects the USB host device 10 and the USB end device 30. For example, the USB communication connection 20 includes a USB cable and a USB connector. For example, the USB connector is Micro-USB connector, and includes a D+ signal wire P_D+, a D− signal wire P_D−, a VDD signal wire P_VDD, a GND signal wire P_GND and an ID signal wire P_ID.

The USB host device 10 includes a slave control unit 10a, a power unit 10b, and power switches 10c1 and 10c2. For example, the power unit 10 is an alternating-current to direct-current (AC-DC) converter for providing a reference $V_{USB}$ and auxiliary charging currents C_D+ and C_D−. The slave control unit 10a controls the switching of the power switch 10c1, so as to selectively output either the auxiliary power supply voltage current C_D+(corresponding to an input end A of the power switch 10c1) or a data signal S_D+ (corresponding to an input B of the power switch 10c1). The slave control unit 10a further controls the switching of the power switch 10c2, so as to selectively output either the auxiliary power supply voltage current C_D− (corresponding to an input end A of the power switch 10c2) or a data signal S_D− (corresponding to an input B of the power switch 10c2). For example, under normal operating conditions, the power switches 10c1 and 10c2 are switched to respective input ends B to correspondingly output data signals S_D+ and S_D−.

The USB end device 30 includes a host control unit 30a, a detecting unit 30b, power switches 30c1 and 30c2, a power supply unit 30d, and a physical layer 30e. The power supply unit 30d includes a charging unit 30d1 and a battery 30d2. The power switch 30c1 has its input end coupled to the D+ signal wire P_D+, and its output ends A and B respectively coupled to the physical layer 30e and the power supply unit 30d. The power switch 30c has its input end coupled to the D− signal wire P_D−, and its output ends A and B respectively coupled to the physical layer 30e and the power supply unit 30d.

In response to a control command CE, the power switches 30c1 and 30c2 selectively provide signals transmitted by the D+ and D− signal wires P_D+ and P_D− to either the physical layer 30e or to the power supply unit 30e. Under normal operating conditions, the command CE is a non-enable command. In response to the non-enable command CE, the power switches 30c1 and 30c2 provide signals (e.g., the data signal S_D+ and S_D−) transmitted by the D+ and D− signal wires P_D+ and P_D− to the physical layer 30e.

The detecting unit 30b determines whether the USB host device 10 is a DCP, and provides a DCP signal S_DCP when the USB host device 10 is the DCP. For example, according to a current USB specification, the detecting unit 30b sequentially performs VBUS detection, data contact detection, and primary detection as well as secondary detection to determine whether the USB host device 10 is the DCP.

In response to the DCP detection signal S_DCP, the host control unit 30a provides a verification signal S_vf to the slave control unit 10a in the USB host device 10. According to whether the slave control unit 10a correspondingly sends a verification response signal S_vfd, the host control unit 30a further determines whether the USB host device 10 supports a predetermined super DCP power supply mode. For example, the super DCP power supply mode is defined as a self-defined operating mode in which a charging current is provided via the D+ and D− signal wires P_D+ and P_D−. For example, the host control unit 30a provides the verification signal S_vf via the ID signal wire P_ID of the USB connector, and the verification signal S_vf is a signal having a level that is constantly switched between the high reference level VDD and the low reference level GND.

When the super DCP power supply mode is supported by the slave control unit 10a, the slave control unit 10a transmits the verification response signal S_vfd via the ID signal wire P_ID, so as to inform the host control unit 30a that the USB host device 10 supports the super DCP power supply mode.

Upon receiving the verification response signal S_vfd, the host control unit 30a provides an enable command CE to the slave control unit 10a. In response to the enable command CE, the slave control unit 10a controls the power switches 10c1 and 10c2 to switch to respective input ends A, such that the power switches 10c1 and 10c2 correspondingly output and provide the auxiliary charging currents C_D+ and C_D− via the D+ and D− signal wires P_D+ and P_D−, respectively.

The host control unit 30a further provides the enable command CE to the power switches 30c1 and 30c2 to switch the power switches 30c1 and 30c2 to respectively input ends A. Thus, in response to the enable command CE, the power switches 30c1 and 30c2 provide the currents (e.g., the auxiliary charging currents C_D+ and C_D−) from the D+ and D− signal wires P_D+ and P_D− to the power supply unit 30d to charge the battery 30d2.

In contrast, if the host control unit 30a does not receive the verification response signal S_vfd, it means that the USB host device 10 does not support the super DCP power supply mode. At this point, the host control unit 30a provides a non-enable command CE to switch the power switches 30c1 and 30c2 to respective output ends A. Thus, in response to the non-enable command CE, the power switches 30c1 and 30c2 provide signals (e.g., the data signals S_D+ and S_D−) from the D+ and D− signal wires P_D+ and P_D− to the physical layer 30e, thereby accomplishing a USB data transmission operation defined by a current specification.

In an embodiment, the host control unit 30a further refers to a current electric power storage status of the battery 30d1 to determine whether to control the USB system 1 to enter the super DCP power supply mode. For example, the host control unit 30a is coupled to the battery 30d1 to read status information ST of the battery 30d1. Before providing the enable command CE, the host control unit 30a further refers to the status information ST to determine whether the battery 30a1 is in a sufficient power status. For example, the sufficient power status is a status in which electric energy stored in the battery 30d1 is greater than a predetermined threshold.

When the status information ST indicates the battery 30d1 is in a sufficient power status, the host control unit 30a determines that the battery 30da has sufficient electric energy. Accordingly, the host control unit 30a continues to provide the non-enable command CE, which leaves the super DCP power supply mode of the USB system inactivated. When the status information ST indicates the battery 30d1 is not in the sufficient power status, the host control unit 30a determines that the battery has insufficient remaining electric energy. Accordingly, the host control unit 30a provides the enable command CE to activate the super DCP power supply mode of the USB system 1, so as to correspondingly provide a high-rate charging current for charging the battery 30a1. In other words, the host control unit 30a according to the embodiment selectively activates the super DCP power supply mode of the USB system based on information of remaining electric energy in the battery 30d1.

Figure 2:
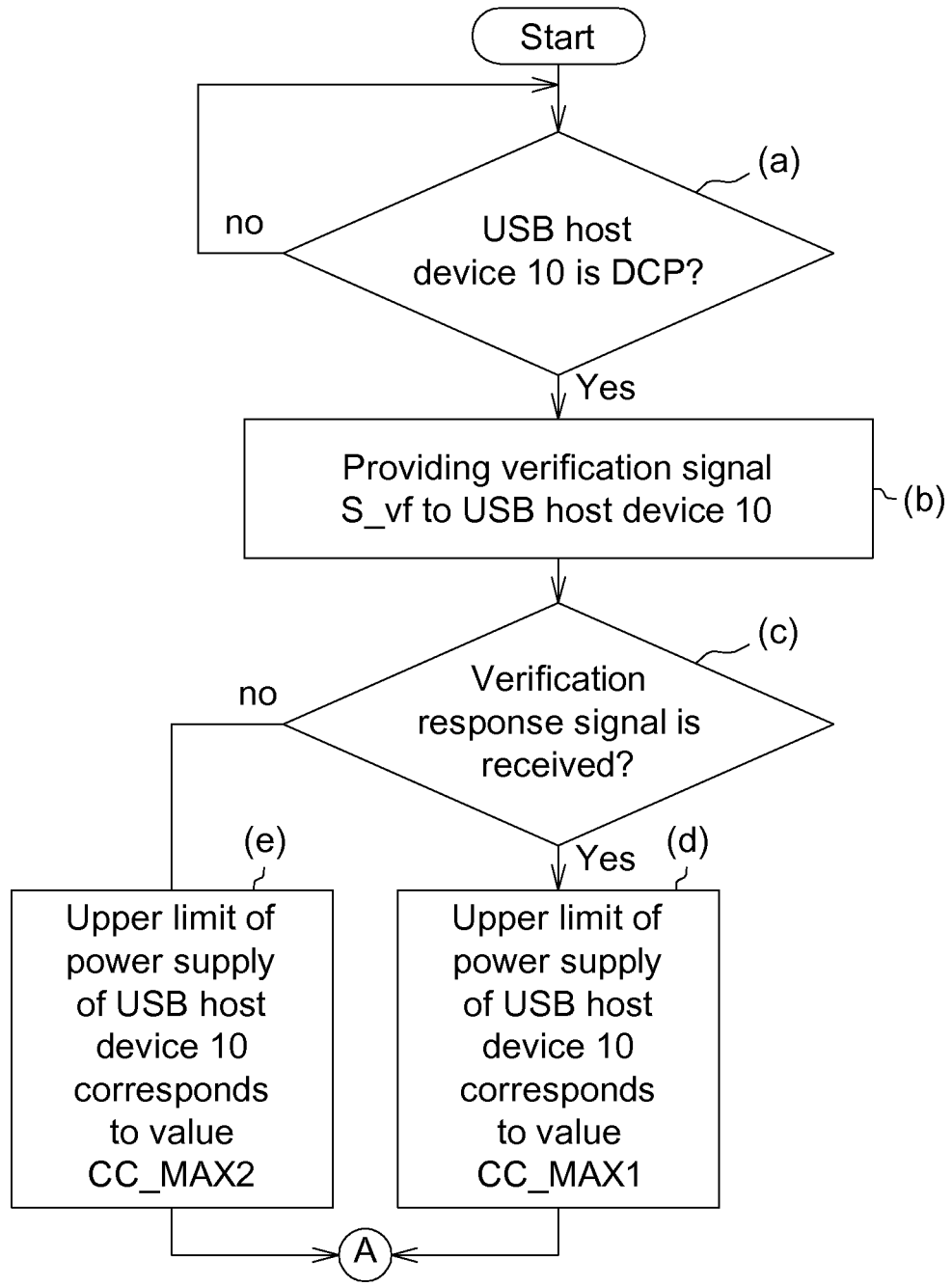
FIG. 2 is a flowchart of a USB power supply method according to an embodiment of the present invention.

FIG. 2 shows a flowchart of a USB power supply method according to an embodiment of the present invention. For example, the USB power method includes steps below. In Step (a), in response to a connection event of the end device 30 being connected the USB host device 10 via the USB communication connection 20, the detecting unit 30b determines whether the USB host device is a DCP, and the method iterates Step (a) if a result is negative.

When the USB host device 10 connected to the USB end device 30 is the DCP, Step (b) is performed in which the host control unit 30a provides the verification signal S_vf to the USB host device 10. In a next Step (c), the host control unit 30a determines whether the verification response signal S_vfd from the USB host device 10 is received. When the verification response signal S_vfd is not received, it means the USB control device 10 does not support the super DCP power supply mode, and thus the USB power supply method ends.

Upon receiving the verification response signal S_vfd, the host control unit 30a performs Step (d). In Step (d), the host control unit 30a determines the USB host device 10 may provide the auxiliary charging currents C_D+ and C_D− via the D+ and D− signal wires P_D+ and P_D−, so as to correspond an upper limit of the charging current of the USB host device 10 to a value CC_MAX1. For example, the value CC_MAX1 equals 4.5 A. In contrast, Step (e) is performed when the host control unit 30a does not receive the verification response signal. In Step (e), the host control unit 30a determines the USB host device 10 cannot provide the auxiliary charging currents C_D+ and C_D− via the D+ and D− signal wires P_D+ and P_D−, such that the upper limit of the charging current of the USB host device 10 corresponds to a value CC_MAX2. For example, the value CC_MAX2 equals 1.5 A.

Figure 3:
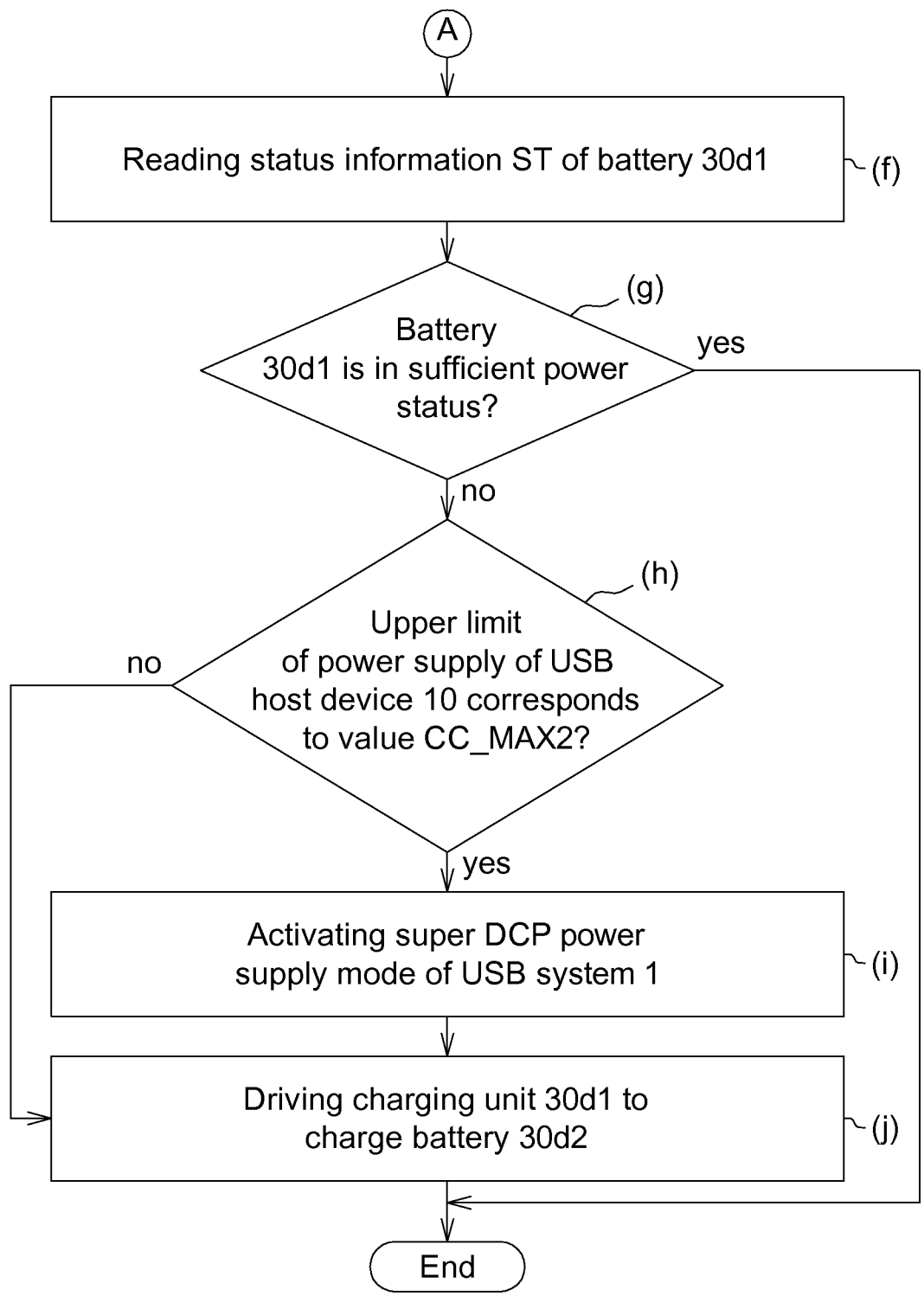
FIG. 3 is a partial flowchart of a USB power supply method according to an embodiment of the present invention.

FIG. 3 shows a partial flowchart of the USB power supply method according to an embodiment of the present invention. In an example, the USB power supply method further includes Steps (f) to (j) after Steps (d) and (e). More specifically, the USB power supply method enters Step (f) after Steps (d) and (e). In Step (f), the host control unit 30a reads the status information ST of the battery 30d1. In Step (g), the host control unit 30a determines whether the battery 30d1 is in a sufficient power status, and the USB power supply method correspondingly ends if a result is affirmative.

When the battery 30d1 is not in the sufficient power status, the USB power supply method enters Step (h), in which the host control host 30a determines whether the upper limit of power supply of the USB host device 10 is substantially greater than the value CC_MAX2. When a result from Step (h) is affirmative, it means the USB host device 10 supports the super DCP power supply mode, and the USB power supply method enters Step (i). In Step (i), the enable command CE is provided to activate the super DCP power supply mode of the USB system. In Step (j), the host control unit 30a drives the charging unit 30d1 to charge the battery 30d2.

When the upper limit of power supply of the USB host device 10 is not substantially greater than the value CC_MAX2, it means the USB host device 10 does not support the super DCP power supply mode, and thus the USB power supply method skips Step (i) to directly enter Step (j).

With the description of the above embodiments, it is illustrated that in the USB power supply method as well as the USB end device and the USB system applying the USB power supply method, when the corresponding USB host device is determined as a DCP, it is then determined whether the USB host device supports a super DCP power supply mode through a verification process on the USB host device. When the super DCP power supply mode is supported, the USB host device is driven to provide auxiliary charging currents via D+ and D− signal wires, so as to allow the USB end device to charge a battery therein with the auxiliary charging current provided by the D+ and D− signal wires. Therefore, compared to the conventional USB power supply method, the USB power supply method as well as the USB end device and the USB system applying the USB power supply method of the present invention are advantaged by being capable of effectively providing a greater charging current and thus a shortened charging time.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A USB power supply method, applied to a USB client end device to charge a battery of the USB client end device, the USB client end device being connected to a USB host device via a USB communication connection, the USB communication connection comprising a D+signal wire and a D−signal wire, the method comprising:
    a) in response to a connection event, determining whether the USB host device is a dedicated charging port (DCP);
    b) providing a verification signal to the USB host device when the USB client device is connected to the DCP;
    c) determining whether a verification response signal from the USB host device is received;
    d) upon receiving the verification response signal, driving the USB host device to provide an auxiliary charging current via the D+and D−signal wires; and
    e) charging the battery according to the auxiliary charging current provided by the D+and D−signal wires.

2. The USB power supply method according to claim 1, between Steps (c) and (d), further comprising:
    f) reading status information of the battery to determine whether the battery is in a sufficient power status; and
    g) performing Step (d) when the battery is not in the sufficient power status.

* * * * *